US007805223B2

(12) United States Patent
Yamaguchi et al.

(10) Patent No.: US 7,805,223 B2
(45) Date of Patent: Sep. 28, 2010

(54) DIALOGUE SYSTEM

(75) Inventors: Takayuki Yamaguchi, Toyota (JP);
Takaaki Enomoto, Anjo (JP); Hiroaki Sekiyama, Shinagawa-ku (JP); Shigeo Onogi, Aichi-gun (JP); Yoshihide Nakane, Okazaki (JP); Junya Kaneko, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 803 days.

(21) Appl. No.: 11/662,225

(22) PCT Filed: Jun. 13, 2006

(86) PCT No.: PCT/IB2006/001570

§ 371 (c)(1),
(2), (4) Date: Mar. 8, 2007

(87) PCT Pub. No.: WO2006/136897

PCT Pub. Date: Dec. 28, 2006

(65) Prior Publication Data

US 2008/0105482 A1 May 8, 2008

(30) Foreign Application Priority Data

Jun. 14, 2005 (JP) ............................. 2005-174334

(51) Int. Cl.
*G08B 3/00* (2006.01)
*G06F 19/00* (2006.01)

(52) U.S. Cl. .............................. 701/1; 701/35; 701/36; 340/436

(58) Field of Classification Search ...................... 701/1, 701/36, 301, 45, 33; 340/436, 439, 691.2; 382/104
See application file for complete search history.

(56) References Cited

U.S. PATENT DOCUMENTS 5,694,116 A   12/1997  Kojima

| 6,401,029 | B1* | 6/2002  | Kubota et al. ............... 701/201 |
| 6,437,689 | B2* | 8/2002  | Kawai et al. ................ 340/439 |
| 6,580,973 | B2* | 6/2003  | Leivian et al. ................. 701/1 |
| 7,292,152 | B2* | 11/2007 | Torkkola et al. ............ 340/576 |
| 2002/0120374 | A1 | 8/2002 | Douros et al. |
| 2003/0043045 | A1* | 3/2003 | Yasushi et al. ............. 340/576 |
| 2004/0088095 | A1* | 5/2004 | Eberle et al. ................. 701/45 |
| 2004/0145496 | A1 | 7/2004 | Ellis |

FOREIGN PATENT DOCUMENTS

| JP | A 06-176296   | 6/1994 |
| JP | B2 2602158    | 1/1997 |
| JP | A-2003-22498  | 1/2003 |
| JP | A-2004-171060 | 6/2004 |
| JP | A-2005-164470 | 6/2005 |
| WO | WO 02/33529 A2| 4/2002 |

OTHER PUBLICATIONS

May 25, 2010 Office Action issued in Japanese Patent Application No. 2005-174334 (with translation).

* cited by examiner

*Primary Examiner*—Tan Q Nguyen
(74) *Attorney, Agent, or Firm*—Oliff & Berridge, PLC

(57) ABSTRACT

A dialogue system that provides a driver with driving advice includes driving performance evaluation means for evaluating a driving performance of the driver estimated based on driving performance information using a normative driving performance as a reference; response evaluation means for evaluating a driver's response to the provided driving advice based on a change in the driving performance of the driver after provision of the driving advice; and output control means for adjusting contents of the driving advice provided to the driver based on the result of evaluation of the driving performance of the driver and setting a mode of expressing the driving advice based on the result of evaluation of the driver's response to the provided driving advice.

11 Claims, 4 Drawing Sheets

DIALOGUE SYSTEM

BACKGROUND OF THE INVENTION

1. Field of the Invention

The invention relates to a dialogue system for a vehicle, which provides a driver with appropriate driving advice.

2. Description of the Related Art

For example, Japanese Patent Publication No. 2602158 describes a conventional voice output device including input means for inputting a destination; storage means for storing road information such as map data and intersection data; multiple voice output portions that output voices; current position detection means for detecting a current position of a vehicle; path determination means for determining a path to the destination, input by the input means, based on the current position detected by the current position detection means and the road information stored in the storage means; and voice output control means for controlling the voices output from the respective voice output portions based on a result of determination made by the path determination means.

In recent years, dialogue systems that provide a driver with various types of driving advice based on a correlation between driving normative models and driving performance history have been proposed, as a developed version of conventional warning systems. However, just providing driving advice to deal with the driving performance that does not conform to the driving norm based on the correlation between the driving normative model and the driving performance history is not very effective. Because driving characteristics of the driver are not taken into account, appropriate driving advice based on the driving characteristics of the driver cannot be provided, and therefore, the driver cannot be led to drive a vehicle more appropriately.

SUMMARY OF THE INVENTION

The invention provides a dialogue system that encourages a driver to drive in a more appropriate manner.

A first aspect of the invention relates to a dialogue system for a vehicle which provides a driver with driving advice. In the dialogue system, driving characteristics of the driver are estimated, and the result of estimation is reflected on the manner in which driving advice is provided to the driver.

In the first aspect, the driving characteristics of the driver may be estimated based on the condition of the driver. Also, the driving characteristics of the drive may be estimated based on driving normative models corresponding to the environment around a vehicle and driving performance history.

In the first aspect, changes in the driving characteristics of the driver may be learned using a time that is required for the driver to respond to the provided driving advice, and the result of learning may be reflected on the manner in which the driving advice is provided to the driver. The contents of the driving advice, which advises the driver of the driving performance that conforms to a driving norm, may be set based on driving performance history.

A second aspect of the invention relates to a dialogue system for a vehicle, which provides a driver with driving advice. The dialogue system includes driving performance evaluation means for evaluating the driving performance of the driver estimated based on the driving performance information using normative driving performances as a reference; response evaluation means for evaluating a driver's response to the provided driving advice based on changes in the driving performance of the driver after provision of the driving advice; and output control means for adjusting contents of the driving advice provided to the driver based on the result of evaluation of the driving performance of the driver and setting a mode of expressing the driving advice based on the result of evaluation of the driver's response to the provided driving advice. The dialogue system may further include advice providing means for providing the driver with the driving advice based on the result of evaluation of the driving performance of the driver.

A third aspect of the invention relates to a method for providing a driver with driving advice, including the steps of estimating driving characteristics of the driver; and reflecting the result of estimation on the manner in which the driving advice is provided to the driver.

In the third aspect, the driving characteristics of the driver may be estimated based on the condition of the driver. Also, the driving characteristics of the driver may be estimated based on the driving normative model suitable for the environment around the vehicle and the driving performance history of the driver In the third aspect, a change in the driving characteristics of the driver may be learned using the amount of time that is required for the driver to respond to the provided driving advice, and the result of learning may be reflected on the manner in which the driving advice is provided to the driver.

According to the invention, the dialogue system that improves the driver's performance in driving a vehicle is provided.

BRIEF DESCRIPTION OF THE DRAWINGS

The foregoing and/or further objects, features and advantages of the invention will become more apparent from the following description of example embodiments with reference to the accompanying drawings wherein.

DETAILED DESCRIPTION OF THE EXAMPLE EMBODIMENTS

Hereafter, example embodiments of the invention will be described with reference to accompanying drawings.

Figure 1:
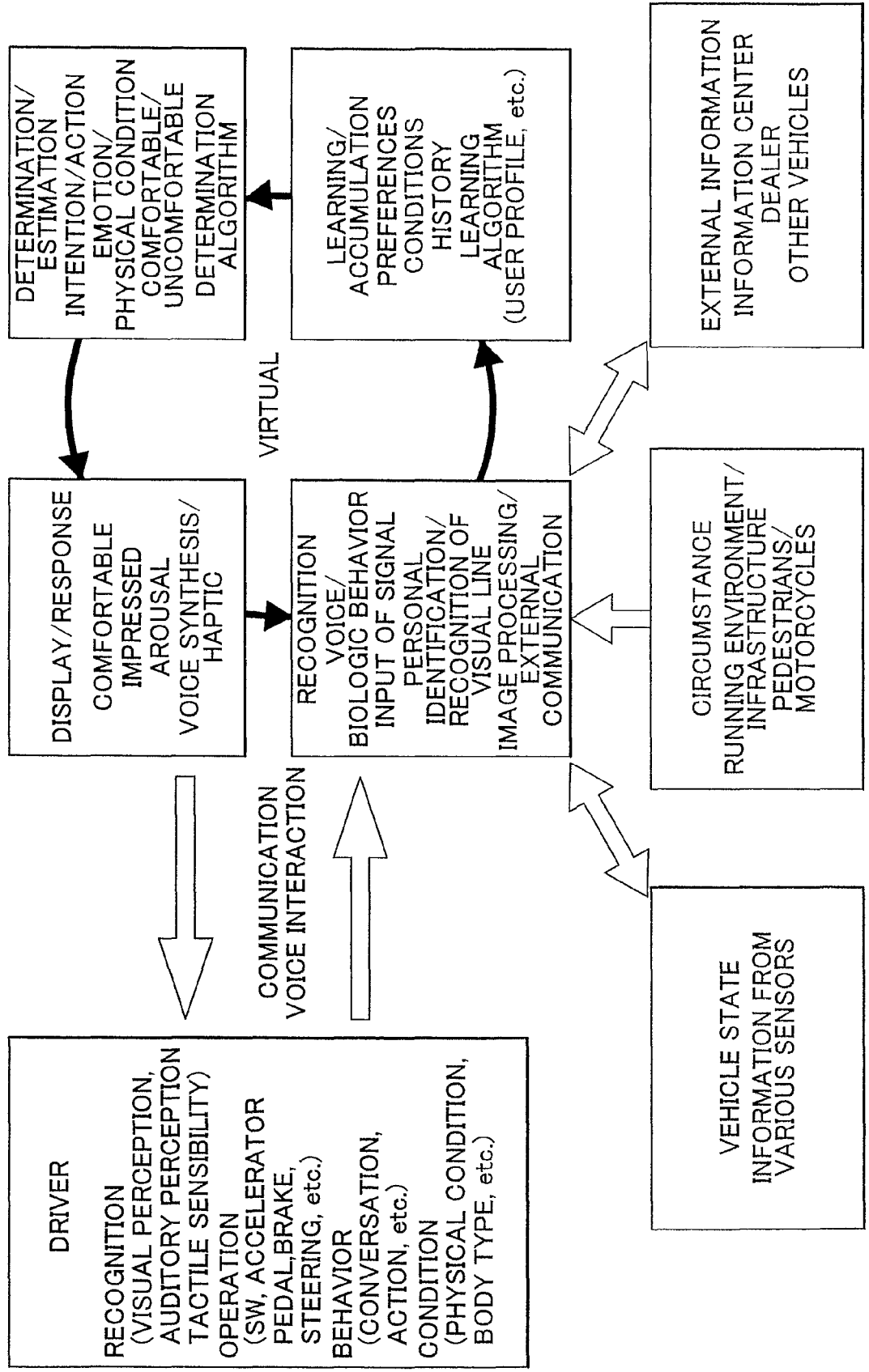
FIG. 1 illustrates the conceptual configuration diagram of a dialogue system according to the invention.

FIG. 1 illustrates the conceptual configuration diagram of a dialogue system according to the invention. The dialogue system provides a driver with appropriate driving advice based, comprehensively, on information about the driver, the vehicle, the environment around the vehicle, etc. to encourage the driver to drive in a more appropriate manner.

The dialogue system includes an appropriate interface used to obtain the driver information and communicate with the driver. Therefore, the dialogue system has a recognition function and a display/response function. The dialogue system also has a function of determining/estimating a driver's intention, etc. based on the information obtained, and a function of leaning preferences of the driver, etc. The dialogue system can be configured by combination of hardware such as a computer and appropriate software. The dialogue system can be mounted in a vehicle.

Figure 2:
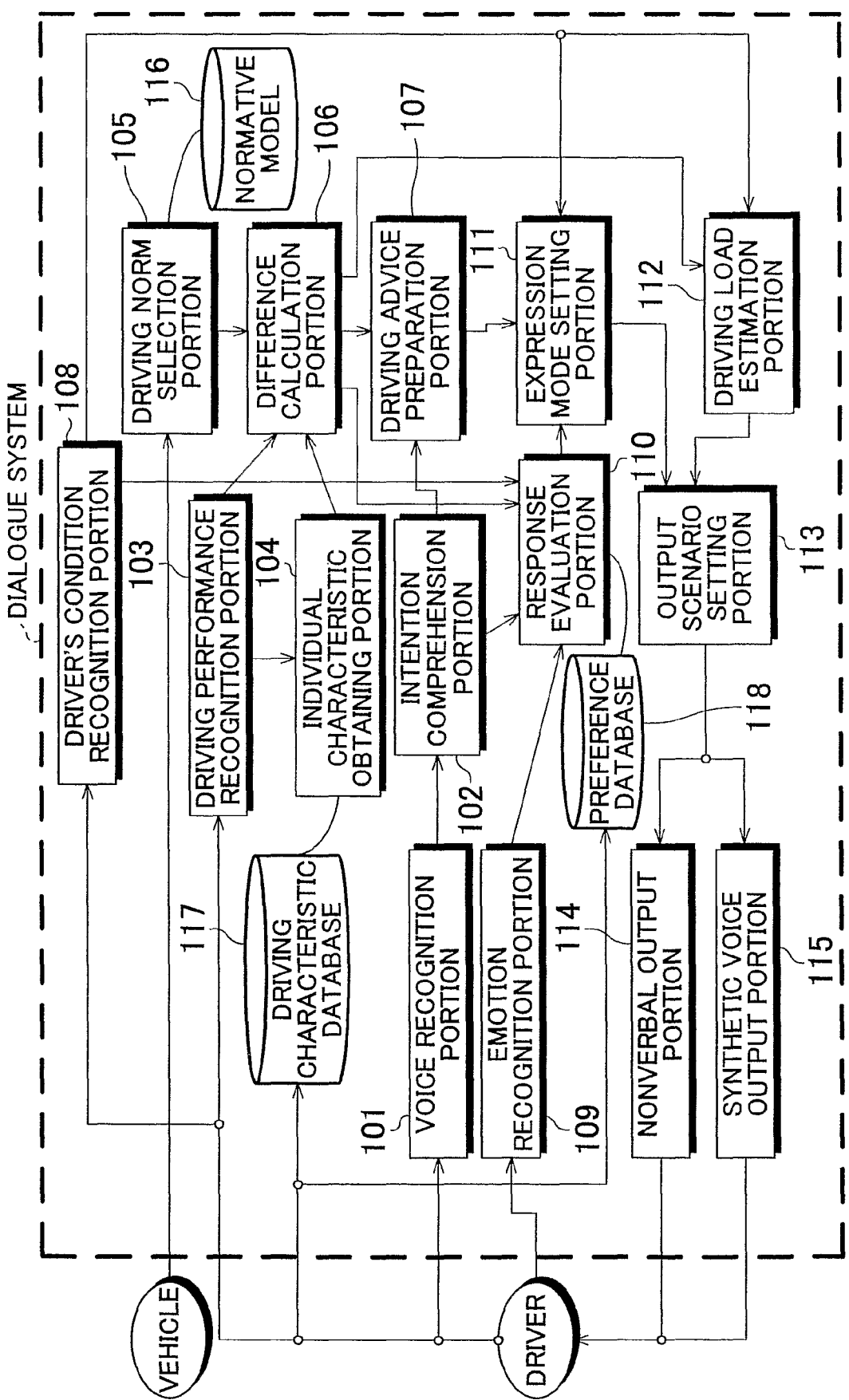
FIG. 2 illustrates the block diagram showing the configuration of a dialogue system according to an embodiment of the invention.

FIG. 2 illustrates the block diagram showing the configuration of a dialogue system according to the embodiment of the invention.

As the driver information, individual profile information such as his/her voice (speech), image, age, sex, and a physiological state are obtained from a driver.

The voice is input in the system via, for example, an in-vehicle microphone provided in a vehicle compartment, and recognized by a voice recognition portion 101. The driver's intention is then comprehended by an intention comprehension portion 102. The comprehended intention is used by a driving advice preparation portion 107 and a response evaluation portion 110, as required. The invention is not limited to any particular voice recognition method. The invention may be applied to any voice recognition processes regardless of the type of hardware configuration and software (voice recognition engine).

The image is input in the system using, for example, an in-vehicle camera provided in the vehicle compartment, and used, along with the voice, to recognize a driver's emotion (for example, whether the driver is calm, angry, happy, or sad) using an emotion recognition portion 109. The driver's emotion may be recognized based on speech rhythm information indicating the characteristics of the voice or speech (for example, the pitch, intensity, and volume of the voice, and pauses within speeches) of a user, and image information indicating the facial expression, gesture, gesticulation, etc. of the user. For example, the reference speech rhythm information and the reference image information corresponding to each type of the driver's emotion may be obtained in advance and stored in a database. Then, the driver's emotion can be recognized by comparing the currently obtained information with the reference information. The in-vehicle camera may be a thermography camera (infrared camera). In this case, the driver's emotion can be recognized based on the image information indicating the heat distribution of a predetermined part of the user's body, for example, the face of the user.

The individual profile information is input by the driver, for example, during default setting. The individual profile information is stored in a driver's driving characteristic database 117 or a preference database 118 that stores information concerning preferences of the driver. The individual profile information is used, as required, when the driving characteristics and the preferences of the driver are taken into account.

The physiological information and operation information are used by a driver's condition recognition portion 108 to recognize a driver's condition (for example, whether the driver is calm, or tensed/excited). The operation information is the information concerning operations of an accelerator pedal, a brake pedal, a steering wheel, and various switches by the driver (information concerning whether an operation is performed, the speed and the frequency at which an operation is performed, etc.). The operation information is prepared based on signals from various sensors (for example, signals from an acceleration stroke sensor, a brake sensor, and a steering sensor) and signals from the various switches. The physiological information includes an electrocardiogram and a pulse. The physiological information is obtained from various biologic sensors such as an electrocardiograph, a heart-rate meter (a heart-rate sensing sensor), a pulse-rate meter that measures a pulse rate and a blood-pressure meter that measures a blood pressure. The biologic sensor may be wrist-watch-type such that the user can carry it. Alternatively, the biologic sensor may be embedded in the steering wheel operated by the driver. The driver's condition recognition portion 108 corresponds to a driving characteristic determining portion in the invention.

The information indicating the behavior of the vehicle (for example, the vehicle speed, longitudinal acceleration, lateral acceleration, and yawing) and the information about the environment around the vehicle (information concerning the running environments, the infrastructure, presence or absence of pedestrians, traffic of motorcycles) are obtained from the vehicle as the vehicle information.

The information indicating the behavior of the vehicle is prepared based on the signals from various sensors mounted in the vehicle (for example, the signals from a vehicle speed sensor and an acceleration sensor).

The information about the environment around the vehicle may be prepared based on the map information obtained from a navigation system mounted in the vehicle, the information detected by, for example, a camera or radar mounted in the vehicle, or the information externally obtained via a communication device mounted in the vehicle. The externally obtained information may include the information transmitted from other vehicles via vehicle-to-vehicle communication as well as information obtained via the road-to-vehicle communication and the radio communication with an operation center.

A driving norm selection portion 105 selects a driving norm appropriate for particular environment around the vehicle and behavior of the vehicle from the normative models stored in a normative model 116 based on the vehicle information obtained in the above-described manner. Accordingly, the driving norms corresponding to the environment around the vehicle and behaviors of the vehicle are stored in the normative model 116. Also, the driving norms may be classified afterward and accumulated. The driving norm appropriate for the environment around the vehicle and the behavior of the vehicle is selected, because some driving norms may change depending on the environment around the vehicle and the behavior of the vehicle although many driving norms are independent of the environment around the vehicle and the behavior of the vehicle. Typical examples of such driving norms that are dependent of the environment around the vehicle and the behavior of the vehicle include stopping the vehicle at a stop-line, stopping the vehicle on a red signal light, and keeping the speed limit. Some driving norms change depending on the environment around the vehicle and the behavior of the vehicle, for example, because an appropriate running speed may change to some extent depending on the traffic around the vehicle, for example, the driver is allowed to drive the vehicle at a vehicle speed considerably lower than the legal speed in congested traffic.

A difference calculation portion 106 calculates the difference between the driving norm selected from the driving norms stored in the normative model 116 and the driving performance of the driver, as the evaluation result of the driving performance of the driver. Namely, the difference indicating an index of evaluation as to whether the driving performance of the driver conforms to the driving norm is calculated. The driving performance of the driver is recognized by a driving performance recognition portion 103 based on the above-described operation information. For example, when the vehicle should stop at a stop-line, if a brake operation for stopping the vehicle is recognized before the stop-line (driving performance), a small difference (small deviation) is calculated, namely, a high evaluation value is calculated. This is just a simple example. The difference may be calculated by comparing the driving performance of the driver with more detailed driving norms to which weights are assigned (for example, the manner in which the driver reduces the vehicle speed to stop the vehicle at an intersection with a stop-line, and whether the driver looks both sides).

When the difference between the driving norm and the driving performance of the driver is calculated, the difference calculation portion 106 takes the individual characteristics (particularly, driving skill) of the driver, obtained from the driving characteristic database 117 by an individual characteristic obtaining portion 104, into account. This is because there are some cases where the allowable maximum vehicle speed may higher for drivers with greater skill, as in the case of the driving norm for the vehicle speed, for example, when the vehicle is going round a curve.

The driving advice preparation portion 107 sets the contents of the driving advice based on the difference calculated by the difference calculation portion 106 and the intention of the driver comprehended by the intention comprehension portion 102. For example, the contents of the driving advice may be primarily set based on the difference between the driving norm and the driving performance of the driver. Secondarily, the intention of the driver may be reflected on the contents of the driving advice. For example, the contents of the driving advice for the situation where the driver neglects to stop the vehicle at a stop-line are set to the advice to the effect that "please stop the vehicle at a stop-line". However, if it has been comprehended that the driver is rushing to his/her destination, the contents of the advice are modified to the advice to the effect that "even if you are in a great hurry, please stop the vehicle at a stop-line. N % of the accidents near stop-lines occur when the driver is in a hurry".

Preferably, the driving advice preparation portion 107 provides the driving advice to the driver by notifying the driver of the driving performance that conforms to the driving norm based on the driving performance history. For example, if it is determined based on the driving performance history that the driver's frequency of stopping the vehicle at a stop-line has increased from 20% to 50%, the advice to the effect that "the frequency of stopping the vehicle at a stop-line has recently improved. Keep up the good work" may be provided. When the frequency of providing the driving advice has decreased, the advice to the effect that "the need for providing the driving advice has recently decreased. Keep up the good work" may be provided. Thus, the effect of fostering the improvement in the driving performance of the driver can also be expected by providing not only a warning but also encouragement and praise for the improvement if it is determined based on the driving performance history that the driving performance of the driver has improved.

An expression mode setting portion 111 sets the mode of expressing the contents of the driving advice set by the driving advice preparation portion 107. The expression mode is set based on the condition (for example, whether the driver is calm or tensed/excited) and the psychological state of the driver that are recognized by the driver's condition recognition portion 108, and the evaluation of driver's response to the driving advice that is evaluated by the response evaluation portion 110 described below in detail. Thus, the appropriate mode of expressing the driving advice can be set based on the condition and psychological state of the driver. From the same viewpoint as above, the contents of the driving advice may be changed based on the condition and psychological state of the driver. For example, if the driver is excited and in a great hurry, the advice to the effect that "please stop the vehicle at a stop-line. Stopping the vehicle at the stop line will not delay your arrival significantly" is provided such that excitement of the driver is not further escalated. At this time, the individual characteristics of the driver such as the temperament obtained from the driving characteristic database 117 by the individual characteristic obtaining portion 104 may be taken into account.

A driving load estimation portion 112 estimates a current load placed on the driver (hereinafter, referred to as a "driving load"), based on the condition of the driver (for example, the condition where the driver is not concentrated on driving, feels sleepy or tensed) recognized by the driver's condition recognition portion 108 and the current driving performance of the driver. Then, the time at which the driving advice is provided is set based on the driving load. Thus, when the driving load is high, for example, when the driver operates the brake and the shift lever at the same time (when the driver is tensed), the driving advice is not provided. On the other hand, when the driving load is low (when the driver feels that a high degree of concentration is not necessary), the driving advice is immediately provided. In such a manner, an appropriate time at which the driving advice is provided is set based on the driving load. Accordingly, it is possible to minimize the problem that the driver is annoyed by unnecessary driving advice provided when it is difficult for the driver to accept the driving advice (when the driving load is high). On the other hand, when the driver can easily accept the driving advice or when driver's attention needs to be actively called, the driving advice is provided. Thus, the effect of the driving advice can be enhanced.

The driving load estimation portion 112 estimates the driving load in consideration of the environment around the vehicle. This is because the driving load varies depending on the environment around the vehicle, for example, the driving load is different between a road on which there is a large number of pedestrians and a road on which there is a small number of pedestrians.

The driving load estimation portion 112 may set a time at which the driving advice is provided based on the intention or the psychological state of the driver, under the same concept as that employed in the expression mode setting portion 111. For example, when the driver is excited and in a great hurry, the time at which the driving advice is provided may be set to a time when the driver calms down or when there becomes no need to hurry, or, in some cases, when the driver uses the vehicle next time, unless the driving advice must be urgently provided.

Figure 3:
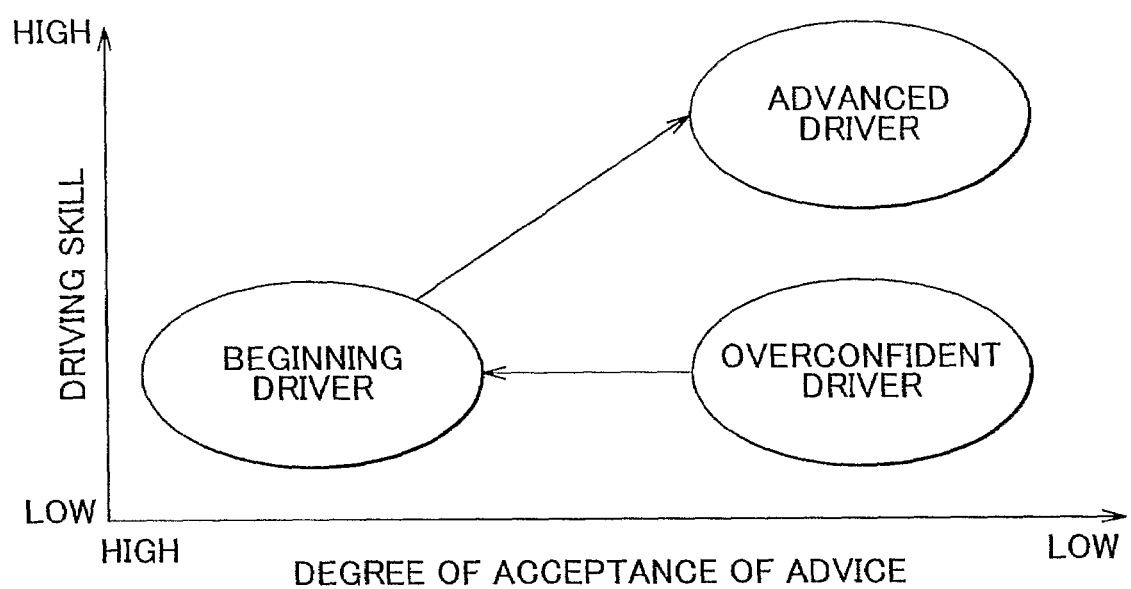
FIG. 3 illustrates the diagram showing the correlation between the level of acceptance of driving advice and driving skill of a driver.

The driving advice preparation portion 107, the expression mode setting portion 111, and the driving load estimation portion 112 may set the contents of the driving advice, the expression mode of the driving advice and the time at which the advice is provided, respectively, in consideration of the driving skill of the driver. As shown in FIG. 3, for a driver (overconfident driver) who has a strong tendency to be disinclined to accept the driving advice (who tends to feel annoyed at the driving advice) in spite of any actual need for such advice, the highest priority is given to provision of the advice having contents that are relatively easy for the driver to accept, provision of the driving advice in the expression mode that makes the driver feel like accepting it or the time of provision that makes the driver feel like accepting the driving advice. To improve the driving performance of such an overconfident driver, it is necessary and important to take stepwise approach, for example, the driver is first lead to accept the driving advice, and, as a result, the driving skill of the driver is improved. The manner in which the driving advice is provided may be set in consideration of the driver's feeling that he/she will feel embarrassed if a fellow passenger notices the driving advice. For example, the frequency of provision of the driving advice may be reduced, or the driving advice may be provided only when only the driver is in the vehicle (only when there is no fellow passenger in the vehicle).

An output scenario setting portion 113 sets the output scenario of the driving advice based on the contents of the driving advice to be provided, the expression mode of the driving advice, and the time at which the driving advice is provided that are set by the driving advice preparation portion 107, the expression mode setting portion 111, and the driving load estimation portion 112, respectively, in the above-mentioned manners. Then, the driving advice is provided via a nonverbal output portion 114 that generates, for example, a warning beep or an audible alarm or a synthetic voice output portion 115 that generates a voice message. The driving advice need not be provided by voice or sound. For example, the contents of driving advice may be indicated as a literal message on the display screen. The output scenario setting portion 113 corresponds to an output setting portion in the invention.

Next, the response evaluation portion 110 that evaluates the "driver's response to the driving advice" will be described.

The response evaluation portion 110 evaluates whether driver's response to the driving advice provided in the above-described manner, namely, whether the driver has accepted the driving advice (for example, the degree of acceptance) based basically on a change in the driving performance of the driver and a change in driver's condition after provision of the driving advice. The result of evaluation may also be an index of evaluation of the effect of the driving advice, and an index indicating the degree of driver's acceptance of the driving advice.

As described above, the result of evaluation made by the response evaluation portion 110 is reflected on the manner in which the driving advice is provided. Seen in this light, the result of evaluation made by the response evaluation portion 110 is an important parameter used to set the manner in which the driving advice is provided. For example, if the driver responds poorly to the driving advice, the contents of the driving advice, the expression mode, or the time at which the advice is provided is modified to fit it to the characteristics of the driver.

Preferably, the response evaluation portion 110 evaluates the driver's response to the driving advice in consideration of the environment around the vehicle. If the environment around the vehicle is not taken into account, the driver's response to the driving advice cannot be accurately evaluated, because the emotion and psychological state of the driver (for example, degree of tension) vary depending on the environment around the vehicle. Thus, when the driver's response to the driving advice is confirmed, it is possible to determine whether the driver responded to the driving advice due to the driving advice or due to a change in the environment around the vehicle. At this time, the speech rhythm information, the image information, and the physiological information may be also used to estimate the emotion and psychological state of the user. This improves reliability of the result of evaluation of driver's response to the driving advice.

Preferably, the response evaluation portion 110 classifies and evaluates the driver's responses based on the amount of time that is required for the driver to modify his/her driving performance (hereinafter, such an amount of time will be referred to as a "time constant").

Figure 4:
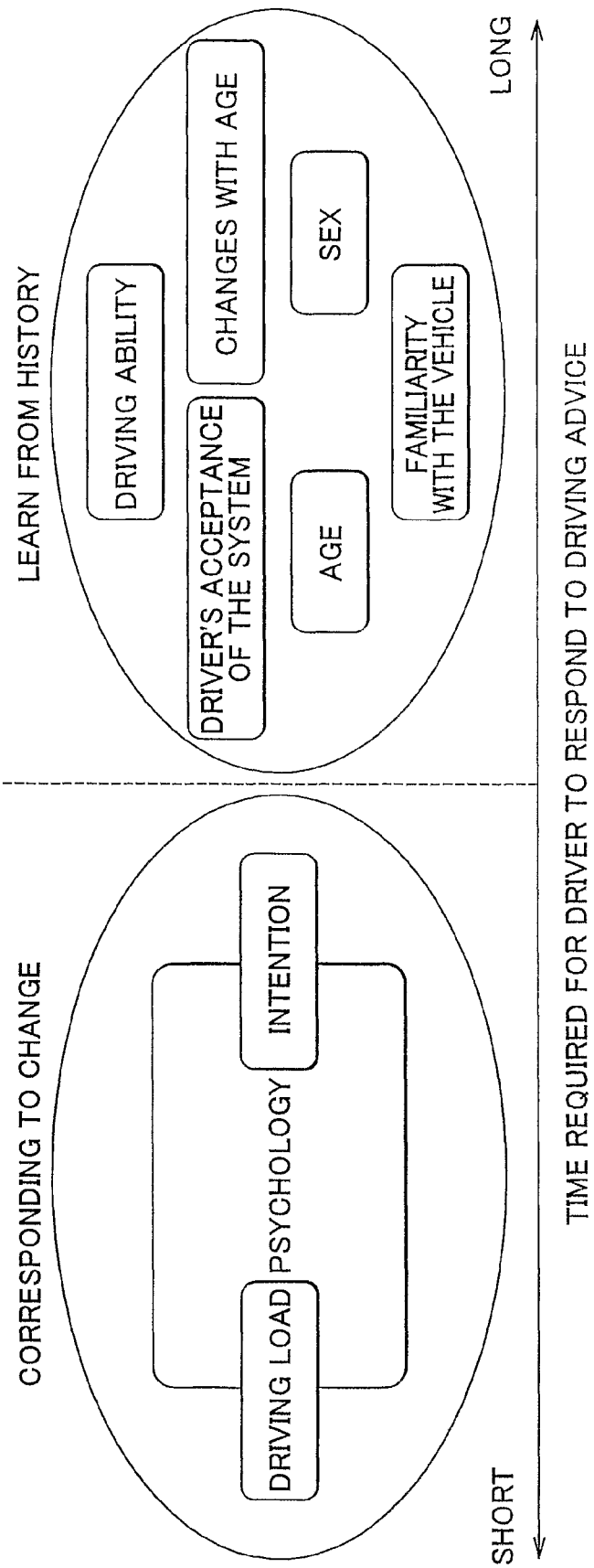
FIG. 4 illustrates the view showing factors that cause variation in speed of driver's response to the driving advice, the factors being grouped by speeds of response to the driving advice.

FIG. 4 shows factors that cause variation in speed of driver's response to the driving advice, the factors being grouped by speeds of response to the driving advice. As shown in FIG. 4, factors that cause variation in speed of driver's response to the driving advice are classified into factors with short time constant and factors with long time constant. Examples of factors with short time constant are the driving load and driver's intention when the driving advice is provided. Examples of factors with long time constant are driving skills, age, familiarity with the vehicle, sex, driver's acceptance of the system, and changes with age. Thus, when the driver responds poorly to the driving advice, the manner of provision of the driving advice may be changed to something more appropriate. For example, when the driver responds poorly due to a factor with long time constant, the driving advice having the same contents may be patiently and periodically provided while, for example, changing the expression mode of the advice. On the other hand, if driver responds poorly to the driving advice just due to a factor with short time constant, for example, the time at which the driving advice is provided may be changed.

The factors with long time constant can be determined or learned based on the individual profile information and the driving performance history data stored in the databases 117 and 118. For example, variation in driver's response to the driving advice and the difference in a change in the response due to ages and sex of the drivers, and a change in the driver's response to the driving advice due to changes in age and familiarity with the vehicle can be learned by accumulating the information concerning individual preferences in the preference database 118. On the other hand, poor response due to the factors with short time constant, namely, the factors that are easily affected by the psychological state of the driver cannot be quickly addressed using the driver's history. The driving load estimation portion 112 estimates and determines the driving load based collectively on the factors concerning the environment around the vehicle that has caused the deviation of the driving performance of the driver from the driving normative model determined based on the environment around the vehicle and vehicle information, and the psychological state (for example, physiological information) of the driver. Also, driver's intention comprehended by the intention comprehension portion 102 can be made to appropriately deal with a change in driver's response by combining the intention comprehended based on the result of voice recognition by the voice recognition portion 101, the psychological (for example, physiological information) state of the driver, and the result of estimation by the emotion recognition portion 109.

In the embodiment, the factors (the information concerning the environment around the vehicle, the driver's condition, the driving load, etc.) when the response evaluation portion 110 determines that the driver responded well may be stored. Thus, the conditions where the driver responded well can be estimated. Namely, the evaluation results obtained by the response evaluation portion 110 and the corresponding information concerning the respective factors are stored in the preference database 118. Thus, the conditions where the user responds well can be estimated for each factor. In this case, the effect of the driving advice can be enhanced by reflecting the estimation result on the manner of provision of the advice (the contents, the expression mode or the provision time of the advice) to the driver on future occasions.

In the same light, the evaluation results obtained by the response evaluation portion 110 and the corresponding manners of provision of the driving advice may be stored in the preference database 118. Thus, the manner of provision of the driving advice (for example, the contents, the expression mode) where the user responds well can be determined. In this case as well, the effect of the driving advice can be enhanced by reflecting the estimation result on the manner of provision of the advice (the contents, the expression mode, or the provision time of the advice) to the driver on future occasions.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

For example, in the embodiment, the dialogue system using mainly voice is described. However, the invention is not limited to the embodiment. The invention may be incorporated in a dialogue system in which the driving advice is provided via a display screen.

The invention claimed is:

1. A dialogue system for a vehicle that provides a driver with driving advice, wherein
    driving characteristics of the driver are estimated, and a result of estimation is reflected on a manner in which the driving advice is provided to the driver, characterized in that
    the driving characteristics of the driver are estimated based on a driving normative model corresponding to an environment around the vehicle and driving performance history, and
    a change in the driving characteristics of the driver is learned using an amount of time that is required for the driver to respond to the provided driving advice,
    wherein the estimated driving characteristics and the change in the driving characteristics are reflected on the manner in which the driving advice is provided to the driver.

2. The dialogue system according to claim 1, wherein the driving characteristics of the driver are estimated based on a condition of the driver.

3. The dialogue system according to claim 1, wherein contents of the driving advice, which advises the driver of the driving performance that conforms to a driving norm, are set based on driving performance history.

4. A dialogue system for a vehicle that provides a driver with driving advice, comprising:
    driving performance evaluation unit for evaluating a driving performance of the driver estimated based on driving performance information using a normative driving performance as a reference and driving performance history;
    response evaluation unit for evaluating a driver's response to the provided driving advice based on a change in the driving performance of the driver after provision of the driving advice, which is learned using an amount of time that is required for the driver to respond to the driving advice; and
    output control unit for adjusting contents of the driving advice provided to the driver based on a result of evaluation of the driving performance of the driver and setting a mode of expressing the driving advice based on the result of evaluation of the driver's response to the provided driving advice.

5. The dialogue system according to claim 4, further comprising:
    advice providing unit for providing the driver with the driving advice based on the result of evaluation of the driving performance of the driver.

6. A method for providing a driver with driving advice, comprising:
    estimating driving characteristics of the driver; and
    reflecting a result of estimation on a manner in which the driving advice is provided to the driver, characterized in that
    the driving characteristics of the driver are estimated based on a driving normative model suitable for an environment around the vehicle and driving performance history of the driver, and
    a change in the driving characteristics of the driver is learned using an amount of time that is required for the driver to respond to the provided diving advice,
    wherein the estimated driving characteristics and the change in the driving characteristics are reflected on the manner in which the driving advice is provided to the driver.

7. The method for providing a driver with driving advice according to claim 6, wherein
    the driving characteristics of the driver are estimated based on a condition of the driver.

8. A dialogue system for a vehicle, comprising:
    a driving characteristic determining portion that determines driving characteristics of the driver, wherein the driving characteristic determining portion is a difference calculation portion that compares a driving performance of the driver with a driving normative model suitable for an environment around the vehicle and driving performance history of the driver to determine driving characteristics of the driver;
    an output setting portion that provides the driving advice to the drive in a manner determined in accordance with the driving characteristics of the driver; and
    a response evaluation portion that monitors an amount of time that is required for the driver to modify a driving performance based on the driving advice provided,
    wherein the amount of time that is required for the drive to modify the driving performance is also used to determine the driving characteristics of the driver, and
    the manner in which the driving advice is provided is determined based on the driving characteristics of the driver determined by the driving characteristic determination portion and the amount of time monitored by the response evaluation portion.

9. The dialogue system according to claim 8, wherein the driving characteristic determining portion is a driver's condition recognition portion that determines driving characteristics of the driver based on a condition of the driver.

10. The dialogue system according to claim 8, further comprising:
    a driving advice preparation portion that sets contents of the driving advice, which advises the drive of the driving performance that conforms to a driving norm, based on driving performance history.

11. The dialogue system according to claim 10, further comprising:
    an expression mode setting portion that sets the contents of the driving advice and a mode of expressing the driving advice based on the contents of the driving advice, a condition of the driver, and a result of evaluation of the driver's response to the driving advice,
    a driving load estimation portion that estimates a load placed on the driver based on the condition of the driver, and that sets a time at which the driving advice is provided,
    wherein the output setting portion provides the driving advice based on the contents of the driving advice and the mode of expressing the driving advice, which are set by the expression mode setting portion, and the time at which the driving advice is provided, which is estimated by the driving load estimation portion.

* * * * *